United States Patent
Vashi et al.

(10) Patent No.: US 9,369,864 B2
(45) Date of Patent: Jun. 14, 2016

(54) METHODS AND APPARATUS FOR CLIENT-BASED CAPABILITIES MANAGEMENT FOR COMMUNICATIONS NETWORKS

(71) Applicant: Apple Inc., Cupertino, CA (US)

(72) Inventors: Prashant H. Vashi, Sunnyvale, CA (US); Vikram B. Yerrabommanahalli, Sunnyvale, CA (US); Thanigaivelu Elangovan, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 202 days.

(21) Appl. No.: 13/623,813

(22) Filed: Sep. 20, 2012

(65) Prior Publication Data

US 2013/0237215 A1 Sep. 12, 2013

Related U.S. Application Data

(60) Provisional application No. 61/608,832, filed on Mar. 9, 2012.

(51) Int. Cl.
*H04Q 7/10* (2006.01)
*H04W 8/22* (2009.01)
*H04W 8/12* (2009.01)

(52) U.S. Cl.
CPC .. *H04W 8/22* (2013.01); *H04W 8/12* (2013.01)

(58) Field of Classification Search
CPC ....... H04W 8/22; H04W 88/06; H04W 88/18; H04W 88/28
USPC ........ 455/435.1, 435.2, 435.3, 436, 439, 434; 370/328, 332, 252, 331
See application file for complete search history.

(56) References Cited

U.S. PATENT DOCUMENTS

| | | | |
|---|---|---|---|
| 8,295,242 B2* | 10/2012 | Rosenberg et al. | 370/331 |
| 8,995,278 B1* | 3/2015 | Vivanco | H04W 36/26 370/237 |
| 2010/0178919 A1* | 7/2010 | Deepak et al. | 455/435.2 |
| 2011/0014913 A1* | 1/2011 | Yoon et al. | 455/435.3 |
| 2011/0016321 A1* | 1/2011 | Sundaram | H04L 63/061 713/171 |
| 2011/0076982 A1* | 3/2011 | Li et al. | 455/404.1 |
| 2011/0170411 A1* | 7/2011 | Wang et al. | 370/235 |

(Continued)

FOREIGN PATENT DOCUMENTS

| | | |
|---|---|---|
| WO | 02065803 | 8/2002 |
| WO | 2009091295 | 7/2009 |

OTHER PUBLICATIONS

PCT Application No. PCT/US2013/029984—International Search Report and Written Opinion dated Aug. 27, 2013.

*Primary Examiner* — Patrick Edouard
*Assistant Examiner* — Julio Perez
(74) *Attorney, Agent, or Firm* — Downey Brand LLP (57) ABSTRACT

Methods and apparatus for client-based capabilities management for e.g., heterogeneous networks. In one exemplary embodiment, a client device associated with a cellular (e.g., EV-DO) network attempts to negotiate a session with a visited network while roaming. The negotiated session is selected from only the set of available capabilities (only the personalities which have a roaming agreement between the home network and the visited network), to ensure that the session negotiation can complete successfully. Once the session is negotiated, the visited network can execute standard authentication and authorization procedures with the assistance of the home network.

18 Claims, 5 Drawing Sheets

(56) References Cited

U.S. PATENT DOCUMENTS

| | | |
|---|---|---|
| 2012/0002541 A1 | 1/2012 | Lee et al. |
| 2012/0014271 A1* | 1/2012 | Damenti ....................... 370/252 |
| 2012/0051328 A1* | 3/2012 | Swaminathan ............... 370/332 |
| 2012/0188980 A1* | 7/2012 | Wang et al. ................... 370/331 |
| 2012/0198081 A1* | 8/2012 | Zhao et al. .................... 709/227 |
| 2013/0102356 A1* | 4/2013 | Shaw ............................. 455/525 |
| 2013/0237215 A1* | 9/2013 | Vashi ...................... H04W 8/22 455/432.3 |
| 2014/0086103 A1* | 3/2014 | Venkatachalam ... H04L 41/5006 370/259 |

\* cited by examiner

METHODS AND APPARATUS FOR CLIENT-BASED CAPABILITIES MANAGEMENT FOR COMMUNICATIONS NETWORKS

PRIORITY

This application claims priority to U.S. Provisional Patent Application Ser. No. 61/608,832 entitled "METHODS AND APPARATUS FOR CLIENT-BASED CAPABILITIES MANAGEMENT FOR COMMUNICATIONS NETWORKS" filed Mar. 9, 2012, which is incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technical Field

The present disclosure relates generally to the field of communication and data networks. More particularly, the present disclosure is directed to methods and apparatus for client-based capabilities management for wireless heterogeneous networks.

2. Description of the Related Art

Wireless networks (such as cellular networks) are typically owned and operated by a Mobile Network Operator (MNO). Visited networks are typically operated by a different MNO than the MNO that a given mobile device is associated with. Roaming services are negotiated between MNOs to provide reciprocal service agreements, and to improve service coverage for their respective subscriber populations.

Different wireless networks may also be heterogeneous with respect to their technology; i.e., each may utilize a different radio area technology (RAT). For example, in the cellular context, one network might implement a "4G" (e.g., Long Term Evolution (LTE)-based) technology, while another implements a legacy "3G" network (e.g., 3GPP2 CDMA). In that these technologies are largely incompatible, mobile device users roaming from one network to another heterogeneous network may not be able to procure roaming access for the newer technologies such as LTE; unfortunately, the mobile device also may not be able to fall back to supported legacy technologies. For instance, while many operators have deployed Long Term Evolution (LTE), and/or upgraded existing evolution-data optimized (EV-DO) networks to support enhanced high-rate packet data (eHRPD; basically an enhancement to EV-DO that enables inter alia, higher data rates and LTE/CDMA handovers), many do not have roaming agreements that support eHRPD for roaming operation. While future developments may eventually provide evolved packet core (EPC) connectivity between roaming partners to support LTE & eHRPD roaming, there is currently no solution for supporting eHRPD roaming access.

Accordingly, new technologies and approaches are needed to provide support for heterogeneous roaming access, such as e.g., for eHRPD technologies.

SUMMARY

The present disclosure provides, inter alia, apparatus and methods for client-based capabilities management for e.g., wireless heterogeneous networks.

A method for client-based capabilities management is disclosed. In one exemplary embodiment, the method includes: identifying a network; determining the available capabilities of the identified network, including at least one capability pursuant to an agreement between the identified network and a home network for the client; publishing the available capabilities to the identified network; and initiating a connection according to at least one of the published available capabilities.

A method for a client device to perform capabilities management in a plurality of communication networks, where the client device is an evolved data optimized (EV-DO) compliant wireless device is disclosed. In one embodiment, the method includes: identifying a network; when the identified network is a visited network, consulting an internal database to determine if the visited network supports enhanced high rate packet data (eHRPD); when the visited network supports eHRPD, publishing eHRPD capability to the visited network; and when the visited network does not support eHRPD, publishing a default capability to the visited network that indicates that the client device supports EV-DO Release 0 and Revision A.

A client device enabled for capabilities management is disclosed. In one exemplary embodiment, the client device includes a transceiver; a processor; and a computer readable medium having instructions which when executed by the processor: identify a network; determine the available capabilities of the identified network, including at least one capability pursuant to an agreement between the identified network and a home network for the client device; publish the available capabilities to the identified network; and initiate a connection according to one or more of the published available capabilities.

In one variant, the client device is a mobile device such as e.g., a cellular telephone or smartphone.

A system for capabilities management within heterogeneous networks is disclosed.

A network entity configured for use with a client-based capabilities management scheme is disclosed. In one embodiment, the scheme is configured for use in a heterogeneous network environment.

A computer readable apparatus is disclosed. In one embodiment, the apparatus includes at least one computer program having instructions which are configured to, when executed by the processor, identify a network; determine the available capabilities of the identified network, including at least one capability pursuant to an agreement between the identified network and a home network for a client; publish the available capabilities to the identified network; and initiate a connection according to one or more of the published available capabilities.

In another embodiment, the at least one program is configured to, when executed: receive decoded channel information obtained from an acquired wireless network; determine based at least in part on the received decoded channel information if the mobile device is roaming in a visited network; when the mobile device is not roaming, cause advertisement of a first set of capabilities; and when the mobile device is roaming, consult a database to determine a prescribed capability of the mobile device that is supported for the mobile device within the visited network, and cause advertisement of the prescribed capability to the visited network.

A method for client-based capabilities management for personality selection within a wireless network is disclosed.

A method of avoiding undesirable latency in providing, or service interruption, for a roaming cellular device is disclosed. In one embodiment, the method includes providing only one or more personalities which have a roaming agreement between a home network and a visited network, so as to ensure that session negotiation for use of the visited network can complete successfully.

A wireless mobile apparatus is disclosed. In one embodiment, the apparatus includes: at least one wireless interface having a prescribed capability; a processor in data communication with the at least one wireless interface; a storage device having a plurality of data relating to network capabilities stored thereon; and logic in data communication with the at least one wireless interface and the processor. In one variant, the logic is and configured to: determine one or more capabilities of a network; identify at least one of the capabilities that is based at least in part on a roaming agreement between the network and a home network of the apparatus; and initiate a connection according to at least one of the at least one of the identified capabilities.

A method of operating a mobile wireless device is disclosed. In one embodiment, the method includes providing to a base station within a only one or more wireless technology personalities which have a roaming agreement between a home network and a visited network associated therewith, so as to ensure that session negotiation for use of the visited network can complete successfully, and avoid entry to a looped or locked state wherein user intervention is required to exit the state.

A method of operating a mobile wireless device is disclosed. In one embodiment, the method includes: providing to a base station of a visited network one or more wireless technology personalities; where the one or more personalities are selected from a set of capabilities supported by the mobile wireless device, the selection based on a roaming agreement between a home network and the visited network; and negotiating a session with the base station, according to the selected one or more personalities.

A wireless base station apparatus is disclosed. In one embodiment, the apparatus includes: a processor; at least one wireless interface in data communication with the processor; and a storage device in data communication with the processor, the storage device comprising at least one computer program. In one variant, the at least one program is configured to, when executed by the processor: receive a communication from a mobile device indicating a desire or intent to establish a wireless connection; and cause transmission of a message to the mobile device including information configured to enable the mobile device to determine at least one of (i) whether a connection should be established with the base station apparatus; and/or (ii) which of a plurality of connection technologies the mobile device should use.

A wireless base station apparatus is disclosed. In one embodiment, the apparatus includes: a processor; at least one wireless interface in data communication with the processor; and a storage device in data communication with the processor, the storage device comprising at least one computer program that when executed by the processor, causes the processor to: receive a communication from a mobile device via the wireless interface, the communication indicating an intent to establish a wireless connection; and cause transmission of a message to the mobile device via the at least one wireless interface, the message including information configured to enable the mobile device to determine at least one of whether a connection should be established with the base station apparatus; which of a plurality of connection technologies the mobile device should use; and wherein the information relates to existence of one or more roaming agreements between an operator of a wireless network with which the base station apparatus is associated and at least one other network operator.

Other features and advantages of the features disclosed herein will immediately be recognized by persons of ordinary skill in the art with reference to the attached drawings and detailed description of exemplary embodiments as given below.

All Figures © Copyright 2012 Apple Inc. All rights reserved.

DETAILED DESCRIPTION

Reference is now made to the drawings, wherein like numerals refer to like parts throughout.

Overview

Heterogeneous network roaming access for wireless user or client devices such as cellular telephones or smartphones is advantageously provided. Specifically, in one embodiment, a client device maintains an internal database which is populated with information regarding home network and visited network compatibilities. Based on this information, the device can determine the appropriate capabilities that can be supported by the visited network. By limiting session negotiation to only the set of available capabilities (e.g., only the capabilities which have a roaming agreement between the home network and the visited network, and which are supported by the client device itself), the session negotiation can complete successfully, thereby reducing or eliminating instances where the negotiation cannot complete (which lead to, among other things, user frustration and reduced user experience).

DESCRIPTION OF EXEMPLARY EMBODIMENTS

Exemplary embodiments are now described in detail. While these embodiments are primarily discussed in the exemplary context of cellular networks including without limitation, third generation (3G) CDMA-2000 wireless networks, and EV-DO networks capable of supporting Release 0, Release A, and Release B (Multi Carrier EV-DO), it will be recognized by those of ordinary skill that the present disclosure is not so limited. In fact, the various principles of the present disclosure are useful in and readily adapted to other cellular technologies including for example: Global System for Mobile Communications (GSM), General Radio Packet Service (GPRS), Enhanced Data Rates for GSM Evolution (EDGE), Universal Mobile Telecommunications Systems (UMTS), Long Term Evolution (LTE), LTE-Advanced (LTE-A), Interim Standard 95 (IS-95), Interim Standard 2000 (IS-2000, also referred to as CDMA-2000), EV-DO (Release 0, Release A, Rev B (Multi Carrier EV-DO), eHRPD), Time Division Single Carrier CDMA (TD-SCDMA), Time Division LTE (TD LTE), etc.

Moreover, the present disclosure is not limited to cellular technologies. It will be recognized by artisans of ordinary skill that the present is applicable to wireless technologies that may make use of roaming capabilities, including for example, Wireless Local Area Networks (WLANs), Personal Area Networks (PANs), and/or Metropolitan Area Networks (MANs).

Cellular Networks and Roaming Access

In the following discussion, an exemplary cellular radio system is described that includes a network of radio cells each served by a transmitting station, known as a cell site or base station (BS). The radio network provides wireless communications service for a plurality of mobile station (MS) devices. The network of BSs working in collaboration allows for wireless service which is greater than the radio coverage provided by a single serving BS. The individual BSs are connected to a Core Network, which includes additional controllers for resource management and is in some cases capable of accessing other network systems (such as the Internet, other cellular networks, etc.).

Figure 1:
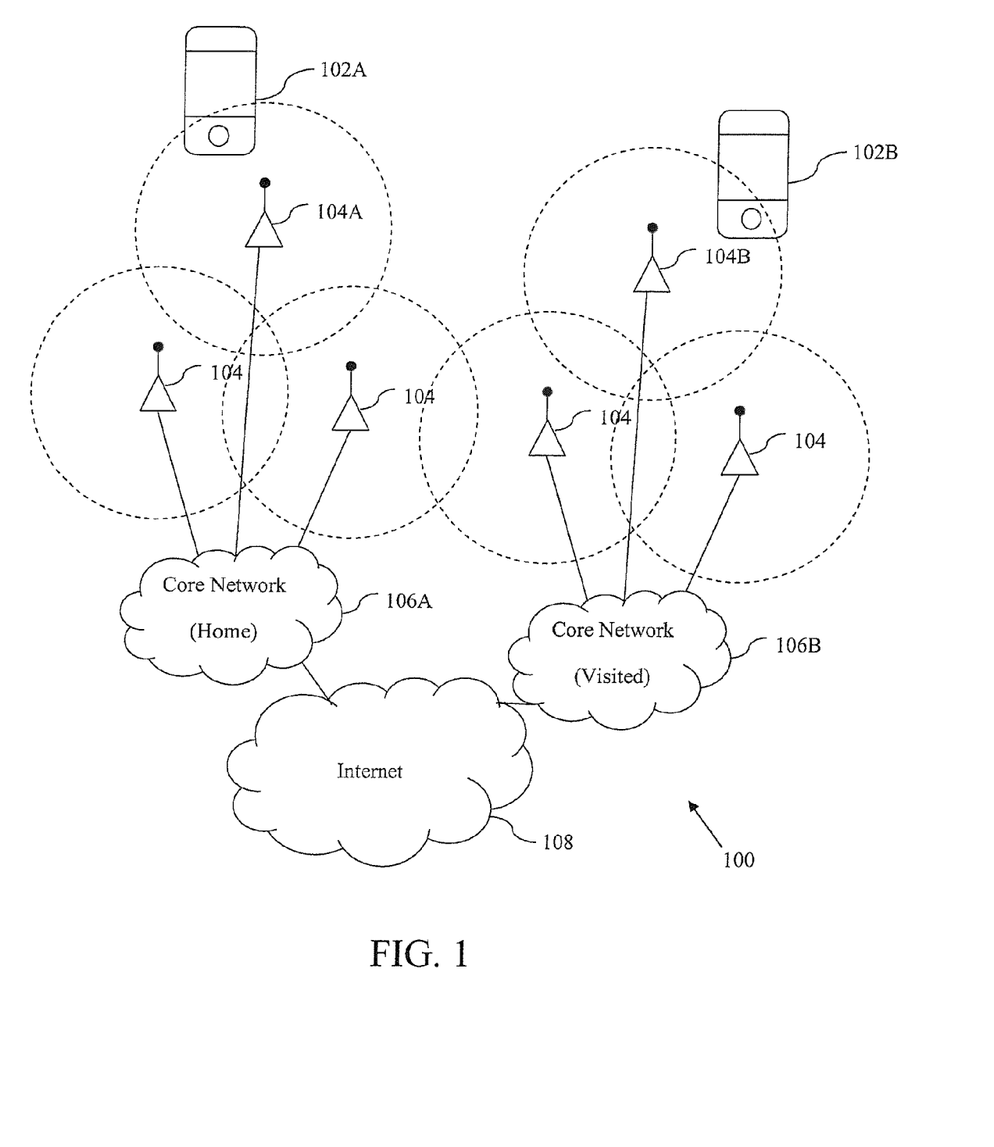
FIG. 1 is a logical block diagram of one exemplary cellular network.

FIG. 1 illustrates an exemplary cellular network 100, with client devices (102A, 102B), operating within the coverage of the Radio Access Network (RAN) provided by a number of base stations (BSs) 104. The Radio Access Network (RAN) is the collective body of base stations and associated network entities that are controlled by one or more Mobile Network Operators (MNOs). The user interfaces to the RAN via the client devices, which in many typical usage cases is a cellular phone or smartphone. However, as used herein, the terms "mobile station", "mobile device", "client device", "user equipment", and "user device" may include, but are not limited to, cellular telephones, smart phones (such as for example an iPhone™ manufactured by the Assignee hereof), personal computers (PCs) and minicomputers, whether desktop, laptop, or otherwise, as well as mobile devices such as handheld computers, PDAs, personal media devices (PMDs), or any combinations of the foregoing.

The RANs of FIG. 1 are coupled to a "home" and a "visited" Core Network (106A, 106B) e.g., via broadband access. Each Core Network (106A 106B) provides both routing and service capabilities. For example, a first client device 102A connected to a first base station 104A of Core Network 106A can communicate with a second client device 102B connected to a second base station 104B of Core Network 106B, via routing through e.g., the Core Networks 106A and 106B and the Internet 108. Similarly, a client device can access other types of services e.g., other Internet services, and/or content delivery mechanisms via the Core Networks (106A, 106B). Each Core Network (106A, 106B) performs a wide variety of functions, including without limitation, authentication of client devices, authorization of client devices for various services, billing client devices for provisioned services, call routing, etc.

As noted previously, cellular networks are owned and operated by a Mobile Network Operator. Typically, a client device is used in a so-called "home network"; the client's home network is operated by the MNO and has the information necessary to authenticate and provision service to the client device (e.g., cryptographic keys used for authentication, service agreements, billing information, etc.). However, it is appreciated by those of ordinary skill in the related arts that the client device may "roam" outside of the home network; accordingly, so-called "roaming" access refers to the set of services that are provided by a "visited network" with which the client device is not associated. Visited networks are typically operated by a different MNO than the MNO that a mobile device is associated with; however, this is not always true (i.e., due to business arrangements, legal regulation, etc.). Roaming services are negotiated between MNOs to provide reciprocal service agreements to improve service coverage for their respective subscriber populations. For example, MNOs typically negotiate roaming relationships with other MNOs in different countries to enable accessibility of voice, data and other supplementary services for their subscribers when they travel internationally.

Existing networks (and client devices) have a wide range in both technological capabilities and business models. For example, a 3GPP2 operator (3GPP2 technologies include e.g., IS-95, CDMA-2000, EV-DO Release 0. EV-DO Release A, EV-DO Rev B, eHRPD, etc.) can deploy 3GPP technologies such as LTE overlaid with or without its 3GPP2 network and have roaming relationships with other 3GPP2 operators and/or 3GPP operators (3GPP technologies include e.g., GSM, GPRS, EDGE, UMTS, LTE, etc.). These so-called "cross technology agreements" can be useful with devices that support multiple technologies (also referred to as "multi-mode" devices); however, it should be noted that a client device having multi-mode capability does not automatically warrant service (a roaming agreement between the operators is required).

For example, operators that have deployed both 3GPP2 and 3GPP technologies may have upgraded their 3GPP2 EV-DO (Evolution Data Optimized) networks to support eHRPD (Evolved High Rate Packet Data) (an evolved version of High Rate Packet Data (HRPD)). eHRPD deployments provide a multitude of services via Evolved Packet Core (EPC) deployments, in accordance with 3GPP Evolved Packet System (EPS) requirements. In this example, a multi-mode eHRPD-capable device can advertise its capabilities to the upgraded 3GPP2 network (e.g., EV-DO with eHRPD capabilities). The network will negotiate an eHRPD capable EV-DO session with the device, thereafter the device can access services provide by the EPC (e.g., on an LTE network).

Accordingly, as used hereinafter, the term "heterogeneous networks" and "hybrid networks" refer generally and without limitation to networks which have substantially different capabilities and/or ownership. While the described the population of cellular networks (e.g., which have different technologies, and/or are operated by different Mobile Network Operators (MNOs)) is an illustrative heterogeneous network, it is further appreciated that heterogeneous networks are widely used in other wireless technologies including for example, wireless local area networking (WLAN) and metropolitan area networking (MAN). For example, commercially successful examples of heterogeneous networks include without limitation Wi-Fi and Wireless Microwave Access (WiMAX) networks. Moreover, heterogeneity may exist by virtue of cross-type capability; i.e., a cellular interface and a WLAN or WMAN.

Evolved High Rate Packet Data (eHRPD) "Personalities"

Extant EV-DO technologies are based on so-called "personalities", where each personality has an associated set of capabilities and behaviors. While a wide range of personality types exist, the following exemplary personalities are used hereinafter for the purposes of simplicity: (i) Release 0, (ii) Revision A, (iii) HRPD, and (iv) eHRPD. It is readily appreciated that 3GPP2 EV-DO technology supports a wide range of personalities including without limitation: Release 0, Revision A, Revision B, Multi-Carrier EV-DO, eHRPD, etc. More generally, service set configurations are widely used in the related arts, the exemplary personalities of EV-DO being purely illustrative. For example, within Universal Mobile Telecommunications System (UMTS), user equipment (UEs) is/are classified according to "category" depending on maximum peak data rate and Multiple Input Multiple Output (MIMO) capabilities support. Still other examples include, for example, Wi-Fi and WiMAX user device categories.

Figure 2:
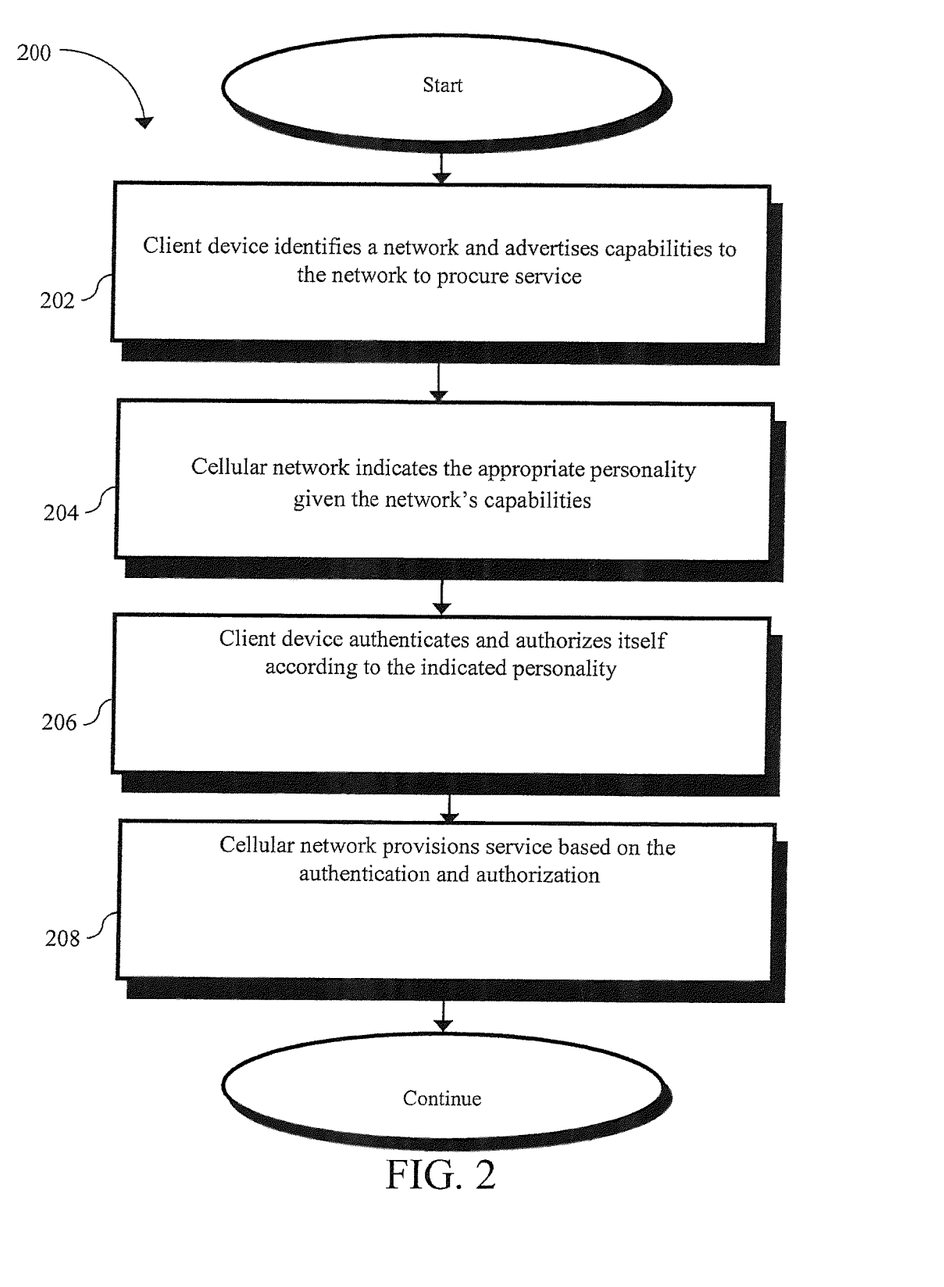
FIG. 2 is a logical flow diagram of one prior art client device session negotiation.

Referring now to FIG. 2, a typical prior art client device session negotiation is shown. At step 202, an EV-DO client device identifies a network and advertises its capabilities to the network to procure service. Consider, for example, one exemplary case where the client device identifies itself as capable of Release 0, Revision A, HRPD, and eHRPD, to a nearby EV-DO cellular network.

Responsive to receiving a client device access request, the cellular network indicates the appropriate personality, given the network's capabilities (step 204). Due to the high cost of infrastructure upgrades, certain network operators may have limited support (or in some cases no support whatsoever) for higher performance personalities. Networks typically select the highest capability that can be supported. In this example, the EV-DO network supports only Revision A, HRPD, and eHRPD; thus, the network will select eHRPD. The client device configures itself according to network instruction.

At step 206, the client device authenticates and authorizes itself according to the indicated personality (e.g., eHRPD). Authentication and authorization is handled according to an IP (Internet Protocol) based Access Network Authentication Authorization Accounting server (AN-AAA) of the EPC.

At step 208, the network provisions service based on the authentication and authorization. For example, once the client device is successfully authenticated and authorized for eHRPD service, the network and client device can complete eHRPD session establishment and commence normal operation.

Unfortunately, as previously stated, newer technologies are not uniformly deployed, thus existing networks may differ significantly in capabilities. Existing networks are not always able to support the procedure of FIG. 2. For instance, while many operators upgraded their EV-DO networks to support eHRPD, many do not have international roaming agreements that support eHRPD for roaming operation. In fact, eHRPD access cannot be realized because the EPCs of different networks are not connected (according to current realizations). Furthermore, since EV-DO networks perform session negotiation before the client device has been authenticated, thus once the device successfully authenticates and determines that no roaming agreement exists, the session will be closed by the network. Since the device does not receive an error message; the device will repeat the procedure endlessly Consider a client device that is capable of supporting eHRPD; during roaming operation, the client device will advertise its eHRPD capability to the visited network. As before, the client device and the visited network will negotiate an eHRPD capable session. Some networks only negotiate a single personality (in this case, the eHRPD personality). For single personality network negotiations, authentication or authorization failures cannot fall back to another personality (e.g., a HRPD personality). Thus, if the visited network does not have an eHRPD roaming agreement with the home network, then the device cannot initiate any roaming access. Even where networks negotiate multiple personality sessions, if the visited network commits to using an eHRPD personality for communication, the visited network cannot switch to non-eHRPD personality if eHRPD roaming support does not exist.

As a brief aside, disconnections can occur for intentional reasons (i.e., without error) and unintentional reasons (i.e., with error). In the foregoing scenario, the connection is intentional, thus neither the visited network client nor the device trigger any recovery mechanism to fall back to more robust technologies (e.g., Release 0, Revision A, etc.). Thus, in either of the two foregoing scenarios, the roaming device will endlessly loop between negotiating an eHRPD capable session with the visited network, configuring itself for eHRPD, and closing the session because eHRPD roaming support doesn't exist.

While future developments may eventually provide EPC connectivity between roaming partners (such as to support LTE roaming), there is currently no solution for supporting eHRPD roaming access. Consequently, improved methods and apparatus are needed for client-based capabilities management for heterogeneous networks. Accordingly, in one embodiment a client device maintains an internal database which is populated with information regarding home network and visited network compatibilities. In one such variant, the database may include information such as SIDS (System Identifiers) or NIDs (Network Identifiers) of visited networks that maintain roaming agreements with the client device's home network. Based on this information, the device can determine the appropriate personalities that can be supported by the visited network. For example, if the device is roaming within a visited network, the device can determine if the visited network supports eHRPD. If the visited network does not support eHRPD access, then the client device will only identify the subset of capabilities that the visited network does support.

Methods—

Figure 3:
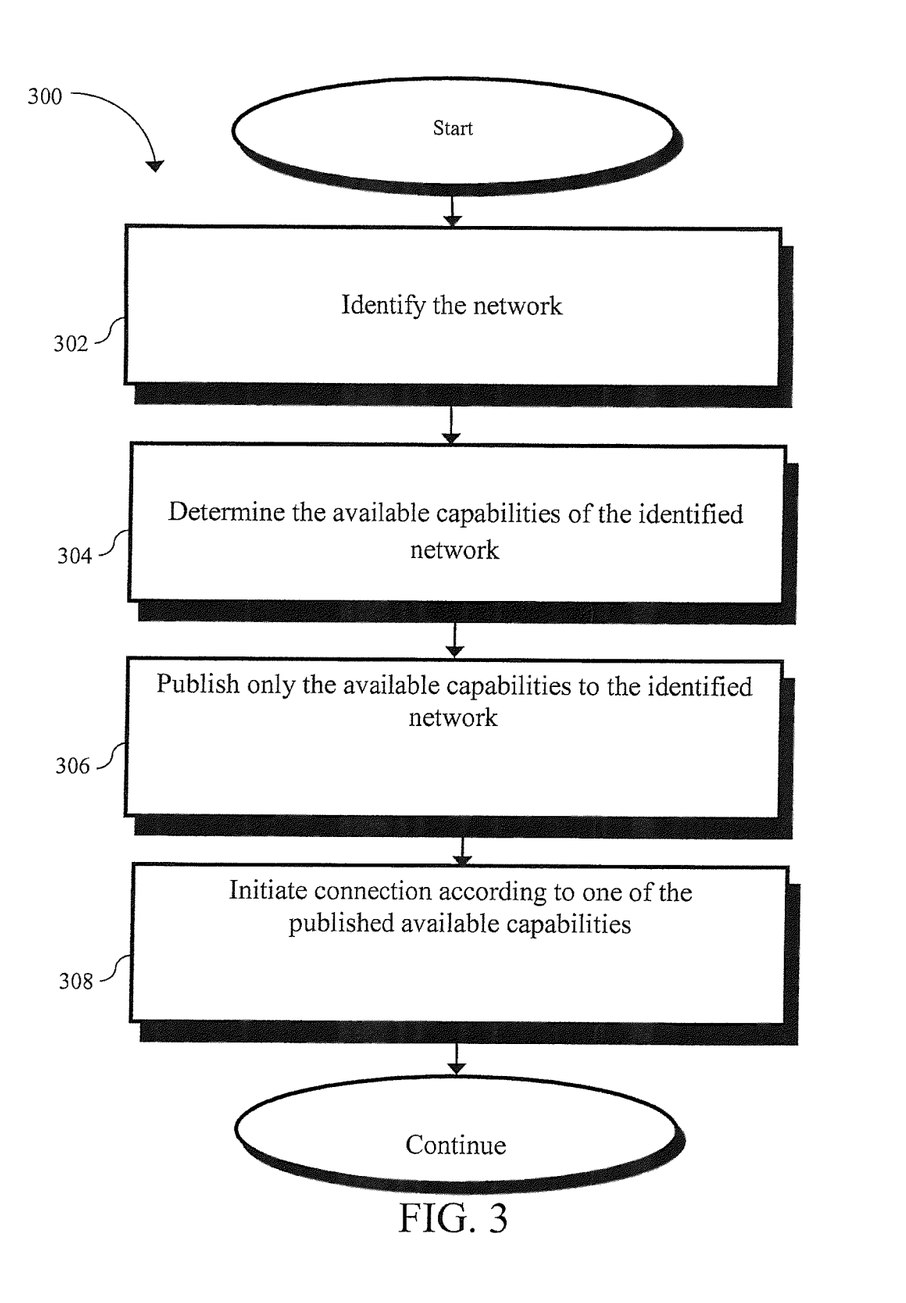
FIG. 3 is a logical flow diagram of one embodiment of a generalized method for client-based capabilities management.

Referring now to FIG. 3, one embodiment of a generalized method 300 for client-based capabilities management for heterogeneous networks is illustrated.

At step 302 of the method 300, the client device identifies a network. In one exemplary embodiment, the client device decodes a control channel of a visited network to initiate roaming access. For example, a CDMA2000 1×, EV-DO compliant client device acquires CDMA2000 1× timing (e.g., via pilot and synchronization channels) and decodes a Forward Common Control Channel (FCCH) to determine network identification which includes both a System Identifier (SID), and Network Identifier (NID). Based on the SID/NID information, the client device can determine if it is roaming (i.e., operating outside of its home network).

Common examples of control channels include, without limitation, (i) pilot channels, (ii) synchronization channels, (iii) reference signals, (iv) beacons, (v) dedicated control channels, (vi) shared control channels, etc. Other common examples of explicitly broadcast identification include, for example: beacons, Master Information Block (MIB), System Information Block (SIB), Service Set Identifier (SSID), etc.). Still other network identification can be performed on the basis of e.g., query/response schemes, user input (where a user inputs the network identification), out-of-band discovery (e.g., via a discovery service), geographic location, etc.

At step 304 of the method 300, the client device determines the available capabilities of the identified network, such as referencing an internal database to determine the available capabilities of the identified network, or alternatively requesting the information from a third party entity or the network itself. As used herein "database" refers without limitation to a data structure providing a listing of one or more networks and their available capabilities. Common examples of analogous data structures include without limitation: arrays, hash tables, lists, etc.

In some embodiments, the database is a complete listing of one or more networks and their associated capabilities based on roaming agreements between the home network of the client device and the visited network. In other embodiments, the database is a "most frequently used" list, where the entries of the list are not comprehensive and may be updated periodically by any of the device, the home network, the user, etc. based on historic and/or predicted use patterns. Alternately, each entry of the database may comprise a network identifier and the unavailable capabilities based on roaming agreements (or lack thereof) between the home network of the client device and the visited network. In still other configurations, the database may be a listing (e.g., listing of networks that have full roaming capabilities, listings of networks that have a specific roaming capability, listings of networks which do not support a specific roaming capability, etc.).

The client device may also receive available capabilities of the identified network from the identified network, or from another network e.g., the client device's home network.

In one exemplary implementation, the available capabilities are determined based on a known relationship between the identified network and a home network associated with the client device. In one such incarnation, the known relationship comprises a roaming agreement between the identified network and the home network. Alternatively, the known relationship may be a lack of roaming agreement between the identified network and the home network. One typical example of a roaming agreement is an agreement between networks to provide a service according to certain prescribed contractual obligations.

In an alternative embodiment, the available capabilities are determined based on a known ability or inability to provide service between the identified network and a home network associated with the client device. For instance, the ability (or inability) to provide service may be based on the identified network having a level of (or lack of) access to information and/or mechanisms controlled within the home network, useful for authenticating or authorizing the client device.

More generally, networks which do not have complete information regarding a client device may be required to commit the client device to a course of action (e.g., configuration of components, set one or more default parameters, set an initial operational mode, etc.) before determining if the client device can be successfully serviced. In these "race condition" scenarios, the client device may be able to gracefully determine the actual capabilities that the identified network can provide, thereby reducing unnecessary and/or "endless loop" actions.

In terms of the database referenced above, it is further appreciated that as networks evolve over time, the client's internal database may also require periodic and/or intermittent update. Updates may be "pushed" to the device (e.g., sent to the device) and/or pulled by the device (e.g., requested by the device). In certain embodiments, the updates may be periodic (e.g., every few weeks, months, etc.), aperiodic (e.g., whenever a new agreement has been reached between the home network and one or more of its partner roaming networks, when prompted by a user, during device maintenance and/or update, etc.), and/or triggered on the basis of an event (e.g., discovery of a previously unknown network, etc.).

In one exemplary implementation, the client device is an EV-DO compliant wireless device capable of supporting multiple EV-DO "personalities". Those of ordinary skill in the related arts will readily recognize that other technologies employ analogous schemes which may be interchanged, given the contents herein. For example, within Universal Mobile Telecommunications System (UMTS), user equipment (UEs) is/are classified according to "category" depending on maximum peak data rate and Multiple Input Multiple Output (MIMO) capabilities support. Still other examples include for example, Wi-Fi and WiMAX user device categories.

In one common variant, the EV-DO client device personalities are selected from the listing including, without limitation: Release 0, Revision A, Revision b, Multi-Carrier EV-DO, eHRPD, etc.

At step 306 of the method 300, the client device "publishes" only the available capabilities to the identified network (i.e., indicates its capabilities to the network). In one exemplary embodiment, the client device transmits only a list of available capabilities. In other implementations, the client device selects only a single available capability for publishing. As yet another alternative, the client device provides notifications based only on conflicting requirements (i.e., the client device does not provide indication if no conflict exists). The client device and identified network may also be configured to have one or more default or "fallback" states.

At step 308 of the method 300, the identified network and the client device initiate connection according to one of the published available capabilities. In one implementation, the identified network selects one of the published available capabilities. Alternatively, the selection of the published available capabilities is performed by a home network entity associated with the client device. In yet other configurations, the client device itself may select the appropriate capability.

For example, within the context of an exemplary EV-DO cellular network, the mobile device attempts to negotiate a session with the visited network according to the available capabilities. Once the session is negotiated, the visited network can execute standard authentication and authorization procedures with the assistance of the home network. Since the selected capability has been selected from only the set of available capabilities (only the EV-DO personalities which have a roaming agreement between the home network and the visited network), the session negotiation can complete successfully.

It will also be appreciated that the order of performance of some of the steps discussed above may be permuted in certain implementations. For example, in one variant, rather than the mobile device selectively screening and publishing capabilities where a roaming agreement or other necessary functionality has been shown to exist, the device may "blindly" acquire the visited network, and attempt to establish a connection (and session). However, in this variant, the base station of the visited network with which the mobile device is communicating may cause the mobile device to perform the foregoing evaluation (such as via a signal or message send on a forward channel such as the FCCH, and which may include the data regarding the visited network's capabilities and requisite functionality, such as underlying roaming agreements) before the connection is completed. The mobile device may use that information to determine whether it also supports a capability that is supported by the visited network (e.g., eHRPD), and if so, complete the connection process. If no support exists, the mobile device may simply terminate the connection in a fashion which avoids the aforementioned "endless loop" (e.g., instigate a fallback or other remedial technology or action).

In one implementation, the message used for the communication of the information is a "repurposed" extant forward channel message which has been adapted to carry the information; the mobile device logic is accordingly configured to identify the information payload within the message upon decode of the forward channel, and extract it so as to perform its evaluation of the base station/visited network. During this evaluation, the connection may be held in a wait state or otherwise suspended by the base station if required, or alternatively the base station can issue a NACK or other such mechanism to cause the mobile device to retransmit information, etc, so as to in effect buy more time for the evaluation.

In another variant, the base station (or associated component in communication therewith) contains logic that allows the base station to identify the home network of the mobile device, and based on that identification, determine technologies that are supported by a roaming agreement between the operators. This "filtered" list can then be sent to the mobile device so that it can complete its evaluation (which may merely be picking the highest capability technology that is on the list and supported by its own hardware).

eHRPD Example Operation—

Figure 4:
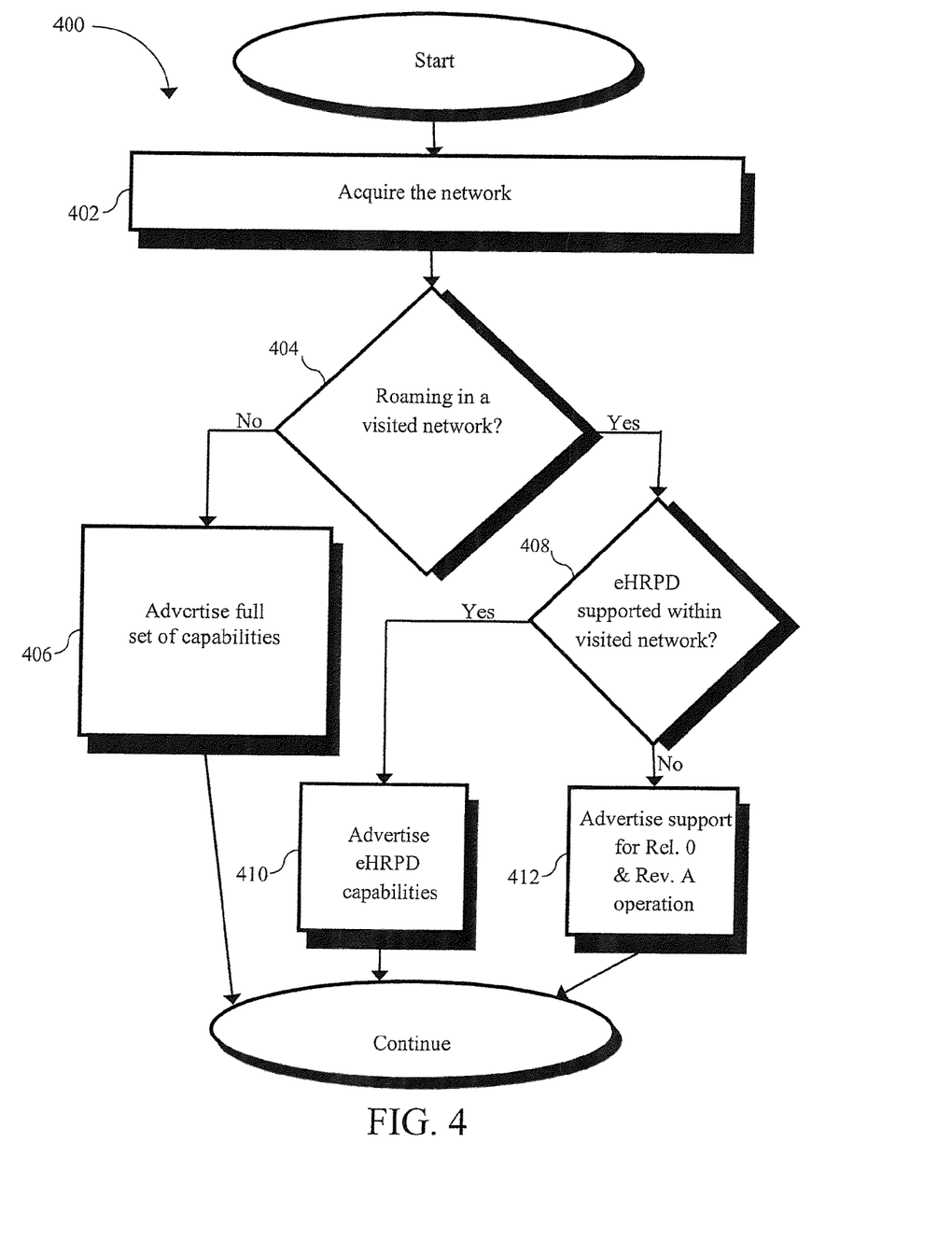
FIG. 4 is a logical flow diagram of one exemplary embodiment of a method for client-based capabilities management for personality selection within existing cellular networks.

Referring now to FIG. 4, one exemplary embodiment of a method 400 for client-based capabilities management for personality selection within EV-DO cellular networks is illustrated.

At step 402 of the method 400, the mobile device acquires the CDMA2000 1× network. The mobile device decodes the Forward Control Channel (FCCH) of the CDMA2000 1× network and decodes the appropriate SID/NID of the network.

At step 404 of the method 400, the mobile device determines if it is roaming in a visited network. Each Mobile Network Operator (MNO) is uniquely identified by a distinct System Identifier (SID) and Network Identifier (NID); based on the SID/NID, the mobile device can determine if the MNO is its home network or a visited network.

If the mobile device is not roaming, the mobile device advertises its full set of capabilities (step 406). The home network can perform legacy authentication and authorization sequences, and initiate a session via legacy schemes. In this example, the mobile device identifies the following EV-DO personalities to the home network: Release 0, Revision A, HRPD, and eHRPD, The home network can proceed to provision service according to the best performance; i.e., eHRPD.

Otherwise, if the mobile device is roaming, the mobile device consults an internal database to determine if eHRPD is supported within the visited network (step 408). In particular, the internal database contains a listing of all MNOs which have a roaming agreement for eHRPD with the mobile device's home network.

If the visited network supports eHRPD, the mobile device can advertise its eHRPD capabilities (step 410). Otherwise, if the visited network does not support eHRPD, the mobile device does not advertise eHRPD (step 412); instead, the mobile device only advertises support for Release 0 and Revision A operation (legacy modes).

Responsively, the visited network treats the mobile device as a Revision A capable device, and authenticates and authorizes the mobile device accordingly. Even though both the visited network and the mobile device may be capable of eHRPD operation, the home network and visited network do not have a roaming agreement in place for eHRPD, and thus the mobile device has avoided a "race condition" by declaring itself as a less capable device.

Hybrid Network Example Operation—

Hybrid networks are composed of multiple radio access networks (RANs) which are coupled in varying degrees to provide service to a population of devices. There may be varying degrees of coordination between networks. For example, consider an exemplary hybrid network system that includes a first LTE RAN (radio access network) and a second CDMA 1× RAN in communication with a user equipment (UE) client device. The degree to which the first LTE RAN, the second CDMA 1× RAN, and the UE are able to coordinate operation is largely determined by how tightly coupled the RANs are. Tightly coupled RANs may share information (e.g., paging information, registration, etc.). Loosely coupled networks may share some information, but remain largely independent. Completely uncoupled networks operate without any coordination whatsoever.

In a loosely coupled network, a so-called single radio LTE (SRLTE) mobile device can support circuit-switched calls on a CDMA 1× network, and packet-switched calls on LTE. Specifically, the mobile device can reuse a single Radio Frequency (RF) processing "chain" for CDMA 1× or LTE processing (referred to hereinafter as a "single-radio"). The single RF chain periodically tunes away from LTE and monitors CDMA 1× activity, and vice versa.

In contrast, tightly coupled hybrid networks may support so-called Circuit Switched Fall Back (CSFB) operation. In one exemplary CSFB capable hybrid network, the CDMA 1× RAN coordinates with the LTE RAN for paging message delivery. Specifically, the CDMA 1× RAN can deliver paging messages to the UE via tunneled signaling through the LTE network. If the UE receives a CDMA 1× network page while connected to the LTE network, the UE will "fall back" to the CDMA 1× network. CSFB networks require significant coordination between the CDMA 1× and LTE RANs, thus CSFB is not widely deployed; most CDMA 1× and LTE networks operate independently.

In one embodiment, depending on the device location and pre-existing carrier information (carrier bundles), the device can dynamically change its capabilities to roam in an optimal and efficient manner. For example, consider a device that supports SRLTE within the United States and CSFB in Japan. When the user lands at an airport in Japan, his device enables CSFB (and disables SRLTE) based on geographic information (determined by either the base station, or a nearby access point (AP)). Similarly, once the device returns to the United States, the device resumes SRLTE and disables CSFB.

Moreover, those of ordinary skill in the related arts will readily recognize that various disclosed features of the present disclosure are generally applicable to client based capabilities management for enabling (or disabling) functionalities. For example, where a technology is wholly unsupported, a device can disable the technology to reduce search times, etc. Egypt only offers 3G UMTS; thus, device operation in Egypt can automatically bar LTE network searches, to reduce unnecessary searches for a network which is not available.

Apparatus—

Figure 5:
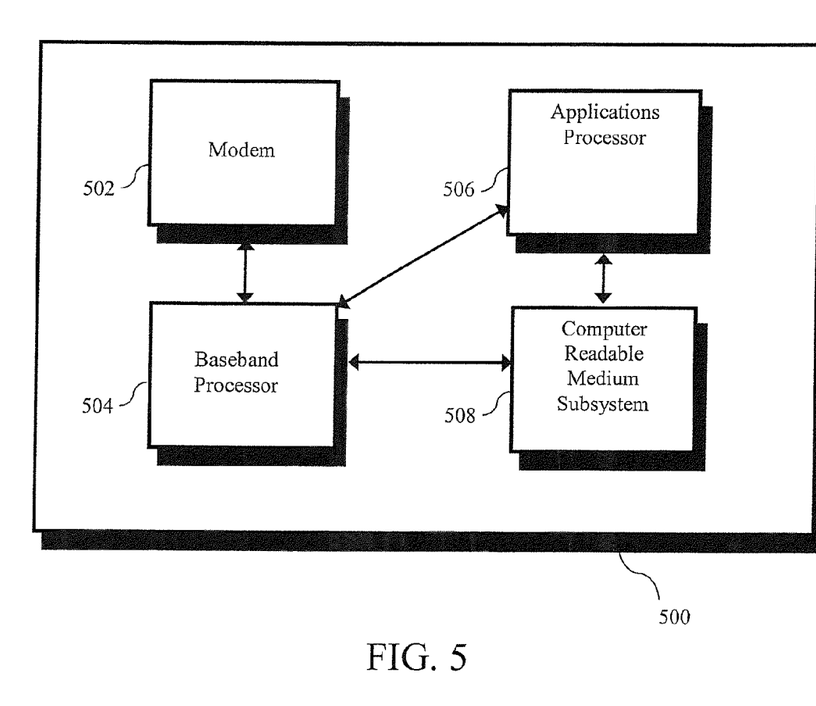
FIG. 5 is a graphical representation of one exemplary embodiment of a client device configured for client-based capabilities management.

Referring now to FIG. 5, one exemplary embodiment of a client device 500 for client-based capabilities management for heterogeneous networks is illustrated. As used herein, the term "client device" includes, but is not limited to cellular telephones, smart phones (such as for example an iPhone™), wireless-enabled tablet devices (such as for example an iPad™), or any combinations of the foregoing. While one specific device configuration and layout is shown and discussed herein, it is recognized that many other configurations may be readily implemented by one of ordinary skill given the present disclosure, the apparatus 500 of FIG. 5 being merely illustrative of the broader principles of the disclosure.

The apparatus 500 of FIG. 5 includes one or more modems 502, a base band processor 504, an applications processor 506 and a computer readable memory subsystem 508. Each modem includes radio components (whether cellular, WLAN, MAN, or otherwise) configured to establish a wireless connection with a wireless network and/or peer entity.

The baseband processing subsystem 504 includes one or more of central processing units (CPU) or digital processors, such as a microprocessor, digital signal processor, field-programmable gate array, RISC core, or plurality of processing components mounted on one or more substrates. The baseband processing subsystem is coupled to computer readable memory 508, which may include for example SRAM, FLASH, SDRAM, and/or HDD (Hard Disk Drive) components. As used herein, the term "memory" includes any type of integrated circuit or other storage device adapted for storing digital data including, without limitation, ROM. PROM, EEPROM, DRAM, SDRAM, DDR/2 SDRAM, EDO/FPMS, RLDRAM, SRAM, "flash" memory (e.g., NAND/NOR), and PSRAM.

The baseband processing subsystem 504 is adapted to receive one or more data streams from the one or more modems 502. The modem is configured for operation with a wireless standard, such as e.g., EV-DO (HRPD) standard. Additionally the modem may be flexibly configured according to one or more personalities.

The application processing subsystem 506 includes one or more of central processing units (CPU) or digital processors, such as a microprocessor, digital signal processor, field-programmable gate array, RISC core, or plurality of processing components mounted on one or more substrates. The application processing subsystem is coupled to computer readable memory 508.

The application processing subsystem 506 is adapted to control overall operation of the device, including for example multimedia processing, operating system controls, program management, etc. In typical embodiments, the application processing subsystem additionally manages and configures the baseband processing subsystem 504 for operation. In one such embodiment, the application processor can configure the baseband processing system in accordance with an internal database or other data structure, as described hereinafter.

In one implementation of the device 500, the memory subsystem 508 additionally comprises an internal database or other data structure which comprises e.g., a listing of one or more networks and their available capabilities. Common examples of analogous data structures include without limitation: arrays, hash tables, lists, etc. In some embodiments, the database is a complete listing of one or more networks and their associated capabilities based on roaming agreements between the home network of the client device and the visited network.

The internal database may be stored and managed by the application processor 506. Alternatively, the internal database may be managed by the baseband processor 504. For example, as networks evolve over time, the internal database may also require periodic and/or intermittent update. Updates may managed within application layer software (executed by the application processor), or alternately received and implemented within the baseband processor.

Alternatively, all or parts of the database may be external to the client apparatus 500, such as being maintained by a network entity (e.g., server) operated by the managed network operator, or a third party. The client apparatus may receive the necessary network/capabilities data via its primary cellular air interface, or alternatively via an ancillary interface such as e.g., a second cellular interface, a WLAN or WMAN interface, etc. The client may obtain the needed information via a "pull", or alternatively have the data pushed to it, such as when determined by a network management process that it is necessary/desirable.

In still other embodiments, the internal database may be stored via a Subscriber Identity Module (SIM) or other secure element. In some cases, the SIM may be a removable media component. In alternate embodiments, the internal database may be stored within a non-removable secure component of the device (such as an electronic SIM (eSIM), etc.).

Myriad other schemes for client-based capabilities management for heterogeneous networks will be recognized by those of ordinary skill given the present disclosure.

It will be recognized that while certain embodiments of the disclosure are described in terms of a specific sequence of steps of a method, these descriptions are only illustrative of the broader methods, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure and claimed herein.

While the above detailed description has shown, described, and pointed out novel features as applied to various embodiments, it will be understood that various omissions, substitutions, and changes in the form and details of the device or process illustrated may be made by those skilled in the art without departing from the contents of the disclosure. The foregoing description is of the best mode presently contemplated. This description is in no way meant to be limiting, but rather should be taken as illustrative of the general principles embodied herein. The scope of the present disclosure should be determined with reference to the claims.

What is claimed is:

1. A method to perform capabilities management for a client device comprising an evolved data optimized (EV-DO) compliant wireless device configured to roam between Mobile Network Operators (MNOs), the method comprising:
   by the client device:
   identifying a network;
   when the identified network comprises a visited network, consulting an internal database to determine whether the visited network supports enhanced high rate packet data (eHRPD) and determine whether the visited network has at least one compatible MNO roaming agreement with a home network of the client device, wherein client device capabilities comprise (i) at least one EV-DO personality, comprising compatibility with one or more EV-DO cellular technologies, and (ii) one or more compatible MNO roaming agreements supported by the home network of the client device;
   when the visited network supports eHRPD, advertising that the client device includes an eHRPD personality to the visited network;
   when the visited network does not support eHRPD, advertising that the client device includes EV-DO Release 0 and Revision A personalities; and
   when both the client device supports at least one EV-DO personality and the home network of the client device has at least one compatible MNO roaming agreement with the visited network:
      (i) initiating a session negotiation between the visited network and the home network of the client device based on the supported at least one EV-DO personality and the at least one compatible MNO roaming agreement; and (ii) when the session negotiation is successful, initiating authentication and authorization of the client device with the visited network, wherein:

identifying the network comprises decoding a forward channel transmission from an entity of the network and extracting at least one identifying data element from the decoded forward channel transmission; and determining whether the visited network supports eHPRD comprises using the extracted at least one identifying data element to access the internal database maintained on the client device.

2. The method of claim 1, wherein the evolved data optimized (EV-DO) compliant wireless device supports a plurality of EV-DO personalities, and wherein consulting the internal database further comprises evaluating at least a portion of the plurality of EV-DO personalities.

3. The method of claim 2, further comprising blacklisting one or more of the plurality of EV-DO personalities based on lack of the at least one compatible MNO roaming agreement associated therewith.

4. The method of claim 1, further comprising:
connecting to a first network with the client device using the EV-DO Release 0 and Revision A personalities before consulting the internal database.

5. The method of claim 1, wherein the internal database is based at least in part on previously determined MNO roaming agreements between the home network of the client device and a plurality of other networks.

6. The method of claim 1, additionally comprising advertising a list of one or more available capabilities of the client device to the visited network, wherein the one or more available capabilities of the client device includes one or more EV-DO personalities.

7. A wireless mobile apparatus, comprising:
at least one wireless interface;
one or more processors in data communication with the at least one wireless interface;
a storage device having data relating to network capabilities stored thereon; and
processing circuitry comprising the one or more processors and memory storing instructions that when executed cause the wireless mobile apparatus to:
determine one or more capabilities of a visited network;
identify at least one of the one or more determined capabilities that is based at least in part on a Mobile Network Operator (MNO) roaming agreement between the visited network and a home network of the wireless mobile apparatus;
identify one or more wireless technology personalities of the wireless mobile apparatus; and
when the visited network supports at least one of the one or more wireless technology personalities of the wireless mobile apparatus and the home network of the wireless mobile apparatus has at least one compatible MNO roaming agreement with the visited network:
(i) initiate a session negotiation between the visited network and a home network of the wireless mobile apparatus, and
(ii) upon a successful session negotiation, initiate authentication and authorization of the wireless mobile apparatus with the visited network,
wherein execution of the instructions further causes the wireless mobile apparatus to preclude attempting to establish a connection with the visited network using any of the one or more capabilities of the visited network so as to prevent the wireless mobile apparatus entering a non-functional state, when none of the one or more capabilities of the visited network is based at least in part on the MNO roaming agreement between the visited network and the home network of the wireless mobile apparatus.

8. The wireless mobile apparatus of claim 7, wherein the non-functional state comprises a looped state wherein the wireless mobile apparatus establishes a connection to the visited network, and then disestablishes the connection due to lack of the MNO roaming agreement between the visited network and the home network of the wireless mobile apparatus.

9. The wireless mobile apparatus of claim 7, wherein the non-functional state comprises a non-error looped state wherein the wireless mobile apparatus fails to instigate any fall-back connection establishment.

10. The wireless mobile apparatus of claim 7, wherein the wireless mobile apparatus identifies the at least one of the one or more determined capabilities that is based at least in part on the MNO roaming agreement between the visited network and the home network of the wireless mobile apparatus by accessing a database of visited network capabilities retained on the storage device of the wireless mobile apparatus.

11. A non-transitory computer readable medium for use on a wireless mobile device having at least one computer program disposed thereon, the at least one computer program having instructions that, when executed by a processor in the wireless mobile device, cause the wireless mobile device to:
receive channel information from an acquired wireless network;
determine based at least in part on the received channel information whether the wireless mobile device is roaming in a visited network;
when the wireless mobile device is not roaming, cause advertisement of a first set of capabilities; and
when the wireless mobile device is roaming:
(i) consult a database to determine a prescribed capability of the wireless mobile device that is supported for the wireless mobile device within the visited network, and advertisement of the prescribed capability to the visited network, wherein the prescribed capability comprises one or more wireless technology personalities and one or more compatible Mobile Network Operator (MNO) roaming agreements,
(ii) initiate a session negotiation between the visited network and a home network of the wireless mobile device according to the prescribed capability, and
(iii) upon a successful session negotiation, initiate authentication and authorization of the wireless mobile device with the visited network,
wherein:
receiving channel information comprises decoding a forward channel transmission from an entity of the acquired wireless network and extracting at least one identifying data element from the decoded forward channel transmission; and
determining whether the visited network supports the prescribed capability comprises using the extracted at least one identifying data element to access the database maintained on the wireless mobile device.

12. The non-transitory computer readable medium of claim 11, wherein the acquired wireless network comprises a 3GPP2-enabled network, and channel information comprises at least one of a system identifier (SID) and a network identifier (NID).

13. The non-transitory computer readable medium of claim 12, wherein the channel information is received in an encoded form via a forward control channel (FCCH) of the 3GPP2-enabled network, and the prescribed capability of the wireless mobile device comprises an enhanced high rate packet data (eHRPD) capability.

14. The non-transitory computer readable medium of claim 11, wherein the prescribed capability of the wireless mobile device comprises an enhanced high rate packet data (eHRPD) capability supported by a compatible MNO roaming agreement between an operator of a home network of the wireless mobile device and an operator of the visited network.

15. A method of operating a mobile wireless device, the method comprising:
providing to a base station of a visited network one or more wireless technology personalities, wherein the one or more wireless technology personalities are selected from a set of capabilities supported by the mobile wireless device, the selection based on a Mobile Network Operator (MNO) roaming agreement between a home network of the mobile wireless device and the visited network; and
when the base station supports at least one of the one or more wireless technology personalities of the mobile wireless device and the home network of the mobile wireless device has at least one compatible MNO roaming agreement with the visited network:
(i) negotiating a session with the base station of the visited network, according to the one or more wireless technology personalities, and
(ii) upon a successful session negotiation, initiate authentication and authorization of the mobile wireless device with the visited network,
wherein the mobile wireless device determines to establish a wireless connection with the base station based on a compatible connection technology by at least:
decoding a forward channel transmission from an entity of the visited network,
extracting at least one identifying data element from the decoded forward channel transmission, and
using the extracted at least one identifying data element to access an internal database maintained on the mobile wireless device.

16. A wireless base station apparatus, comprising:
a processor;
at least one wireless interface in data communication with the processor; and
a storage device in data communication with the processor, the storage device comprising at least one computer program having instructions that, when executed by the processor, cause the wireless base station apparatus to:
receive a communication from a mobile device via the at least one wireless interface, the communication indicating an intent to establish a wireless connection, and
cause transmission of a message to the mobile device via the at least one wireless interface, the message including information to enable the mobile device to determine at least one of:
whether to establish the wireless connection with the wireless base station apparatus, and
which connection technology of a plurality of connection technologies to use,
wherein the information relates to existence of one or more compatible Mobile Network Operator (MNO) roaming agreements between an operator of a wireless network with which the wireless base station apparatus is associated and at least one other network operator, and
wherein the mobile device determines whether to establish the wireless connection by at least:
decoding a forward channel transmission from an entity of the wireless network,
extracting at least one identifying data element from the decoded forward channel transmission, and
using the extracted at least one identifying data element to access an internal database maintained on the mobile device,
wherein when the mobile device determines to establish the wireless connection with the wireless base station apparatus based on a compatible connection technology the mobile device then initiates a negotiation session, and upon a successful negotiation session, the mobile device initiates authentication and authorization with the at least one other network operator.

17. The wireless base station apparatus of claim 16, wherein the message comprises the forward channel transmission associated with the at least one wireless interface.

18. The wireless base station apparatus of claim 16, where the communication from the mobile device comprises second information that identifies supported capabilities of the mobile device based on the one or more compatible MNO roaming agreements.

* * * * *